(No Model.)

H. P. PRUIM.
BREASTPIN.

No. 370,411. Patented Sept. 27, 1887.

WITNESSES.

Henry J. Stapelton.
Geo. M. Cady.

INVENTOR.

Hiram P. Pruim
by
Edson Salisbury Jones
Attorney.

UNITED STATES PATENT OFFICE.

HIRAM P. PRUIM, OF GRAND HAVEN, MICHIGAN.

BREASTPIN.

SPECIFICATION forming part of Letters Patent No. 370,411, dated September 27, 1887.

Application filed June 15, 1887. Serial No. 241,370. (No model.)

*To all whom it may concern:*

Be it known that I, HIRAM P. PRUIM, of Grand Haven, Ottawa county, State of Michigan, have invented a new and useful Improvement in Breastpins; and I do hereby declare the following specification, taken in connection with the accompanying drawings, forming a part of the same, to be a description thereof.

This invention relates to breastpins and similar articles; and the improvement consists in bending or forming the rear end of the fastening-pin into coils to produce a bearing portion, and mounting such pin on a stud secured to the body of the article, and headed or spread at its free or outer end to retain the pin in pivotal connection therewith, as hereinafter described and claimed.

Figure 1:
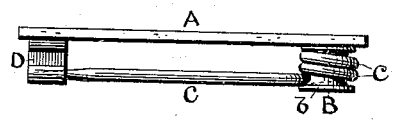
Figure 2:
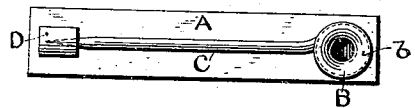
Figure 3:
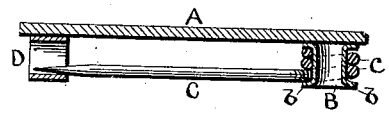
Figure 4:
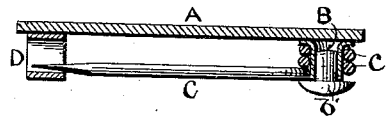
Figure 5:
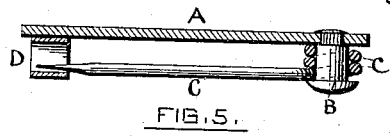

In the accompanying drawings, Figure 1 represents a side view of a breastpin embodying the invention. Fig. 2 shows a rear view of the same. Fig. 3 shows the breastpin in longitudinal section. Figs. 4 and 5 represent similar views showing modified forms of the headed stud upon which the fastening-pin is mounted to swing or turn in a plane parallel with the body of the article.

A represents a plate, which may be of any preferred form or style, and be adapted to form the back plate of the body or front of the breastpin, or to be the body itself of the article.

As shown in Figs. 1, 2, and 3, there is soldered or otherwise secured to the plate A a tubular stud, B, which is to form the pivot upon which the pin C is to turn in a plane parallel with the plate A, although the stud may be made integral with the plate by drawing it up therefrom, as will be readily understood. The pin C at its rear end is bent or formed into circular coils $c$, two such coils being shown in the drawings, though the number may be varied, the said coils forming the bearing portion of the pin upon the stud B and serving to separate and to hold the pin C the desired distance from the plate A. To retain the pin in pivotal connection with the stud, the free or outer end, $b$, of the latter is by proper tools bent outwardly or spread, as shown in Figs. 1, 2, and 3, such bent or spread portion $b$ forming the head of the stud. The plate A is supplied with any preferred form of catch D, to retain the pin C in a fastened position.

In place of heading the stud B by spreading its free end, as described, and shown in Fig. 3, the stud may be made shorter and the heading be effected by a headed pin, $b'$, as shown in Fig. 4, driven into or otherwise secured to the stud; or, in place of employing a tubular stud, the stud may be solid and headed, as shown in Fig. 5, and be secured to the plate A in any preferred manner—as by riveting—particularly if said plate form the back of the article.

By coiling the rear end of the pin C, as described, to form a bearing portion which shall hold the pin at all times the desired distance from the plate A, and employing a headed stud secured to the plate as a pivot for said pin, a breastpin or similar article can be constructed with little labor and at small cost, and have the desirable elements of durability and good action.

What I claim, and desire to secure by Letters Patent, is—

1. The combination, with the body or plate A, of the pin C, coiled at its rear end to form a bearing portion, and a headed stud, B, projecting from the plate, passing through the coiled end of the pin, and forming a pivot therefor, so that the pin may swing in a plane parallel with the plate, substantially as set forth.

2. The combination, with the body or plate A, of the pin C, coiled at its rear end to form a bearing portion, and a tubular stud, B, projecting from the plate, forming a pivot for the pin, and having its free end bent outwardly or spread to hold the pin in place thereon, substantially as set forth.

HIRAM P. PRUIM.

Witnesses:
EDSON SALISBURY JONES,
GEO. M. CADY.